(12) United States Patent
Lear

(10) Patent No.: US 7,195,104 B2
(45) Date of Patent: Mar. 27, 2007

(54) LIFTING AND TRANSPORTING DEVICE

(75) Inventor: Adam Thomas Lear, Two Wells (AU)

(73) Assignee: Austech and Design Pty Ltd, Two Wells (AU)

( * ) Notice: Subject to any disclaimer, the term of this patent is extended or adjusted under 35 U.S.C. 154(b) by 180 days.

(21) Appl. No.: 10/486,246

(22) PCT Filed: Aug. 9, 2002

(86) PCT No.: PCT/AU02/01073

§ 371 (c)(1),
(2), (4) Date: Feb. 5, 2004

(87) PCT Pub. No.: WO03/014001

PCT Pub. Date: Feb. 20, 2003

(65) Prior Publication Data

US 2004/0213656 A1    Oct. 28, 2004

(30) Foreign Application Priority Data

Aug. 9, 2001 (AU) .................................. PR6892

(51) Int. Cl.
*B66F 9/06* (2006.01)
*B66F 9/14* (2006.01)
*B65F 9/16* (2006.01)
*B65G 9/12* (2006.01)
*B65G 9/19* (2006.01)

(52) U.S. Cl. ............... 187/222; 414/642; 414/663

(58) Field of Classification Search ............ 187/203, 187/204, 216, 217, 222, 223, 224, 225, 226, 187/231, 237, 238; 414/662, 663, 664, 668, 414/639, 640, 641, 642
See application file for complete search history.

(56) References Cited

U.S. PATENT DOCUMENTS

| | | | | |
|---|---|---|---|---|
| 1,941,767 A | * | 1/1934 | Towson | 414/639 |
| 2,884,144 A | * | 4/1959 | Laws | 414/640 |
| 3,484,004 A | * | 12/1969 | Hughey | 414/710 |
| 3,700,132 A | * | 10/1972 | Waters | 414/705 |
| 4,015,738 A | * | 4/1977 | Gibson et al. | 414/629 |
| 4,084,715 A | * | 4/1978 | Stedman | 414/629 |
| 4,442,921 A | * | 4/1984 | Sherman | 187/403 |
| 4,632,627 A | * | 12/1986 | Swallows | 414/490 |
| 5,590,735 A | * | 1/1997 | Cartier | 180/210 |
| 5,709,523 A | * | 1/1998 | Ware | 414/715 |
| 5,752,584 A | * | 5/1998 | Magoto et al. | 187/234 |
| 6,616,395 B2 | * | 9/2003 | Fransson | 414/495 |

FOREIGN PATENT DOCUMENTS

| | | | | |
|---|---|---|---|---|
| GB | 2084957 A | * | 4/1982 | |
| JP | 02138100 A | * | 5/1990 | |

* cited by examiner

Primary Examiner—Kathy Matecki
Assistant Examiner—Eric E. Pico
(74) Attorney, Agent, or Firm—John E. Vandigriff

(57) ABSTRACT

A lifting device (10) includes a base frame (12), the base frame having associated drive means: a lifting arm (44) connected at a first end thereof to a frame (42), the lifting arm being pivotally movable with respect to the frame and being movable between a withdrawn condition and an extended lifting condition; and a lifting cradle being movable between open and engaged positions. The device is suitable for use in the movement of hospital beds and trolleys.

11 Claims, 5 Drawing Sheets

LIFTING AND TRANSPORTING DEVICE

FIELD OF THE INVENTION

The present invention relates to a lifting and transporting device. The device of the invention is useful for lifting and moving, amongst other items, a bed or a trolley.

BACKGROUND OF THE INVENTION

Whilst a variety of lifting devices are known there are no devices of which the inventor is aware that are specifically adapted for lifting and moving hospital beds. Nevertheless, from time to time there is a need to move around hospital beds and, furthermore for hospital employees to do so in a safe manner that both protects their health, the safety of their co-workers and also protects the bed itself which is generally a valuable item. Similar comments apply in relation to the movement of complex and heavy chairs of the type that are used in hospitals.

SUMMARY OF THE INVENTION

Therefore, according to the invention there is provided a lifting device characterised by
  a base frame said frame having associated drive means;
  a lifting arm connected at a first end thereof to the frame
    said lifting arm being pivotally movable with respect to the frame and being movable between a withdrawn condition and an extended lifting condition; and
  a lifting cradle located at a tree end of said lilting arm, said lifting cradle being 20 movable 20 between open and engaged positions.

In a preferred form of the invention the when the lifting arm sin the withdrawn condition the arm is secured within the frame so that the device maintain a low profile as to be useable to move articles from a position close to a ground surface. The device of the invention is thus suitable for maneuvering below relatively low horizontal edges and rails for lifting purposes.

Preferably, a hydraulically or electrically power driven actuator is used for effecting movement of the lifting arm between the withdrawn and extended conditions. Thus, the operator is relieved of the need to manually effect a lifting action—which may be beneficial in the base where heavy or repeated lifting operations are to be undertaken. However, it is to be appreciated that the invention may also be embodied in forms where a manually pumped hydraulic lifting system is used.

More preferably still the movement of the lifting arm between the withdrawn condition and the extended lifting condition and the movement of the lifting cradle between the open and engaged positions occurs sequentially under the operation of a single actuator. In this way the lifting arm is gradually able to lift and then engage the article to be lifted in a single smooth operation. Such a combined sequential operation can be effected in an arrangement in which the lifting arm moves only a predetermined distance and is stopped by from further movement by vertically applied pressure such that action of the actuator is then concentrated on the cradle and whereby the cradle has at least a portion thereof adapted to rotate in response to movement of the actuator to thereby complete the operation.

In a convenient form of the invention the lifting arm is acted on by both a linear actuator and, in an opposing direction by biasing means that serve to moderate the action of the actuator Preferably, the frame includes both positioning wheels mounted thereon for positioning beneath an article to be lifted and drive wheels associated with said drive means.

It is convenient that the drive means are operated by two electric motors coupled to reduction gear boxes powered by one or more rechargeable batteries thereby eliminating the need to have any mains power supplied to the device during operation.

DESCRIPTION OF DRAWINGS

The above and other objects, features, and advantages of the present invention will be apparent from the following detailed description of a preferred embodiment in conjunction with the accompanying drawings. In the drawings.

DESCRIPTION OF THE PREFERRED EMBODIMENT

Figure 1:
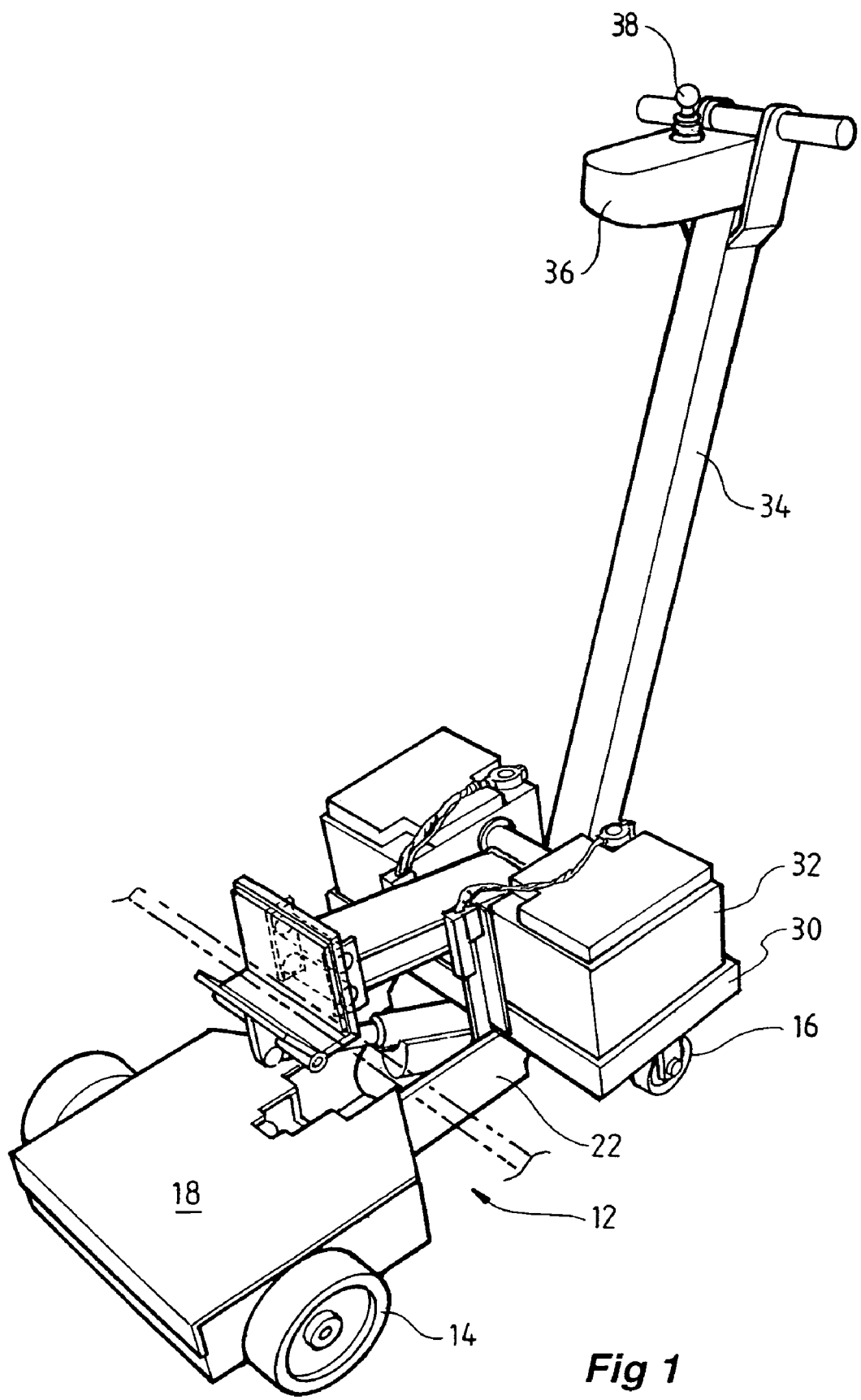
FIG. 1 illustrates in perspective view a lifting device in accordance with the present invention.

In the embodiment illustrated in the drawings a bed lifter 10 includes a frame 12 on which are mounted forward and rearward wheels 14 and 16 respectively. The frame 12 is of sufficient width to pass between the corner legs of a single width hospital bed.

The frame 12 is constructed of three interconnected portions, namely a front section including a housing 18, intermediate frame section 20 and a rearward portion of the frame 12 in the form of a rearward extension formed by plates 22.

The housing 18 has an uppermost level surface that sits just below the level of the forward wheels 14. The forward wheels 14 are drive wheels and also serve to locate the frame 12 beneath a bed to be lifted. The forward wheels 14 are powered by drive means in the form of two motors (not shown) located within the housing 18 between the drive wheels 14. The rearward wheels 16 are castor located below the frame 12.

Immediately to the rear of the forward housing is the intermediate frame section 20. The intermediate frame section 20 is considerably narrower in width than the housing 18 and the side plates 22 define a channel in which is supported a linear actuator 24. The actuator 24 is secured at either side to the side plates 22 by means of pins 26. The actuator 24 is freely rotatable about the pins 26.

It can be seen from the drawings that the frame 12 forms a relatively low rise open platform that is suited to be positioned below any horizontal cross members on beds and other equipment without producing any mechanical interference with the equipment. Further, the rear of the housing 18 has angled and cut out portions that allow the platform and actuator to attain its lowest position.

Behind the actuator 24 is the rearward portion of the frame 12 in the form of a rearward extension of the plates 22 that form a platform 28. The platform 28 extends the full width of the frame 12 and includes side-walls 30 that serve to locate and position a pair of batteries 32 thereon. The batteries 32 provide power to the motors and are rechargeable batteries thereby eliminating the need to have any mains power supplied to the device during operation.

The rearward wheels 16 are positioned beneath the platform 28.

Figure 2:
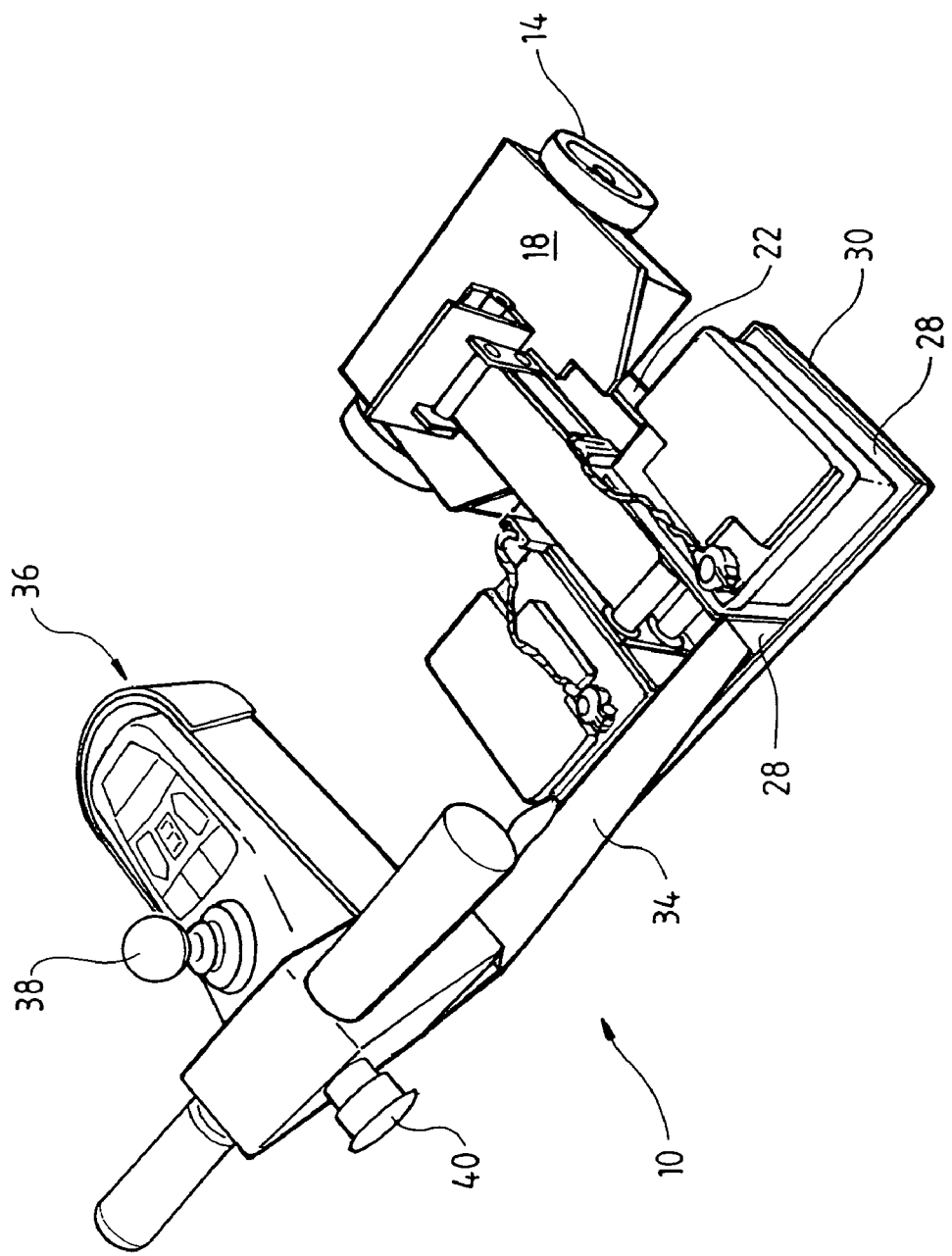
FIG. 2 illustrates an upper perspective view of the lifting device of FIG. 1.

As seen in FIG. 2, a handle 34 is positioned at the rear of the frame 12. The handle 34 is pivotally connected to the frame 12 and, furthermore includes controls therein that operate the motor and the actuator 24. A control unit 36 is located at the top of the handle 34. The control unit is operatively connected to both the motors and the actuator 24. The control unit 36 allows for variable speed control for forward and backward movement of the device 10. Forward and backward movement is instigated through lever 38 and a brake 40 allows the operator to stop the device quickly in an emergency. Electronic control units are available for purchase and an off the shelf item is readily adapted to suit the needs of the present device. Variable speed indicators and controllers may be incorporated into the control unit together with more sophisticated options such as a battery power gauge to display the availability of power from each battery included in the unit.

As can be seen from FIG. 2 a space is created between the batteries 32. On inside edges of the batteries 32 an open space therebetween is defined by upstanding brackets 42. The brackets 42 assist both in locating of the batteries 32 and as a point of attachment for a lifting arm 44.

In the embodiment under consideration the lifting arm 44 takes the form of a pair of vertically spaced bars 46 each pivotally attached to the brackets 42 at uppermost and lowermost points 48 and 50 respectively. The lifting arm 44 extends forwardly over the frame 12 and includes a lifting cradle 52 carried on the end of the arm 44. The cradle 52 is pivotally attached to each of the bars 46 at uppermost and lowermost pivot connections 54 and 56 respectively. A pair of rear flanges 55 on the lifting cradle 52 serves as points of attachment for the bars 46 through pivot connections 54 and 56.

Figure 3:
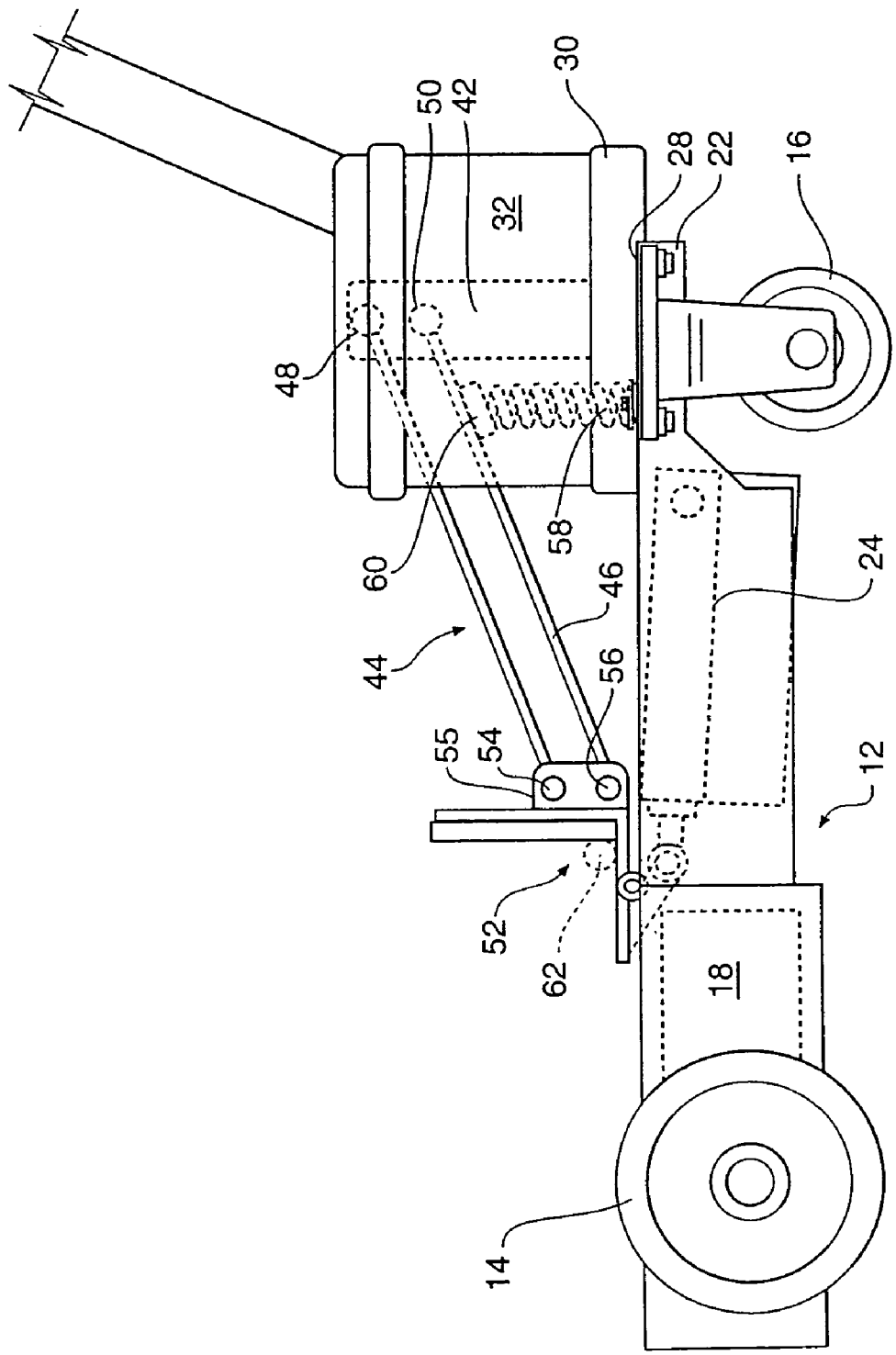
FIG. 3 shows a side view of the lifting device of FIG. 1 in a lowered position.
Figure 4:
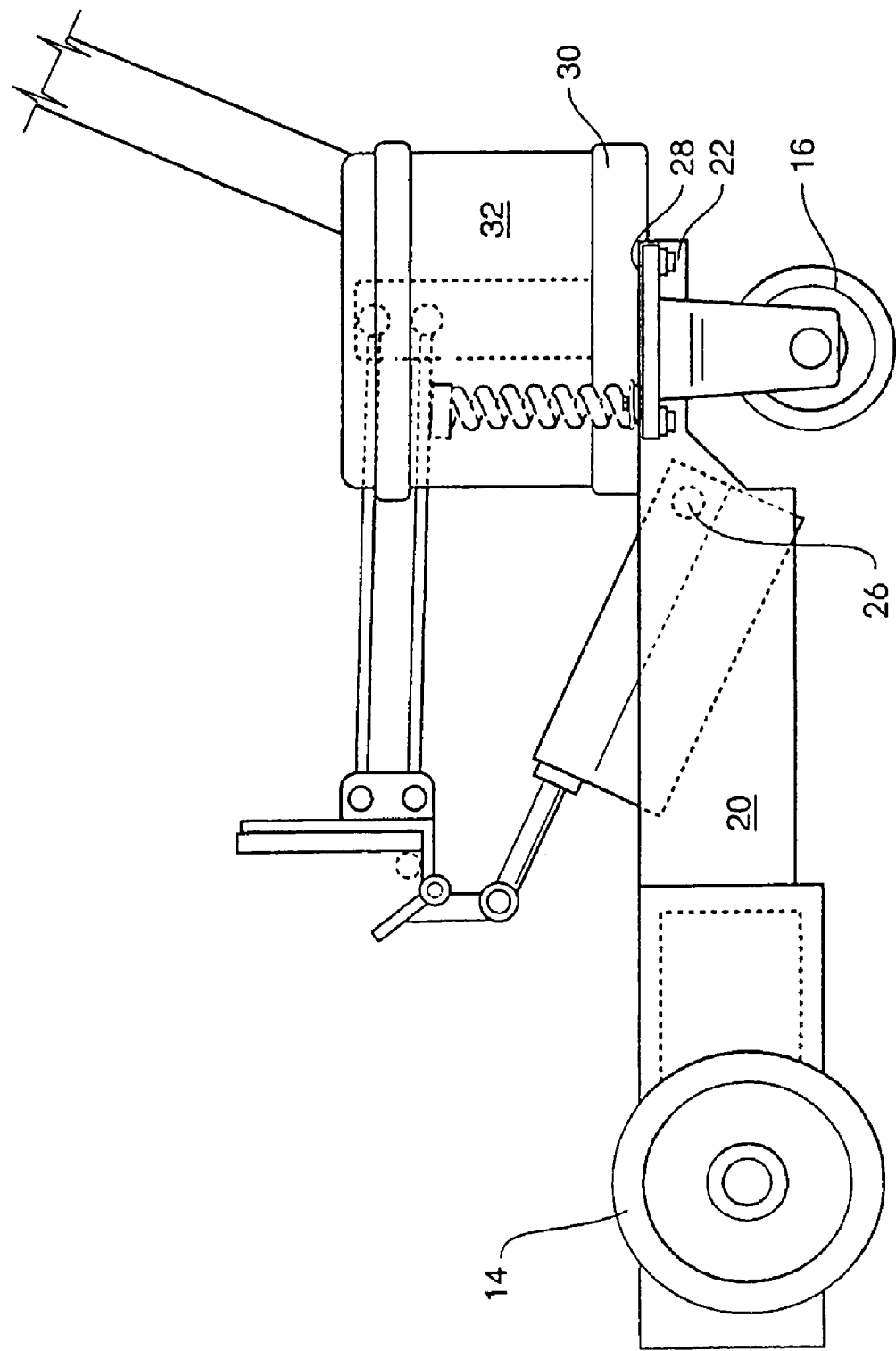
FIG. 4 shows a side view of the lifting device of FIG. 1 in a partially raised position.
Figure 5:
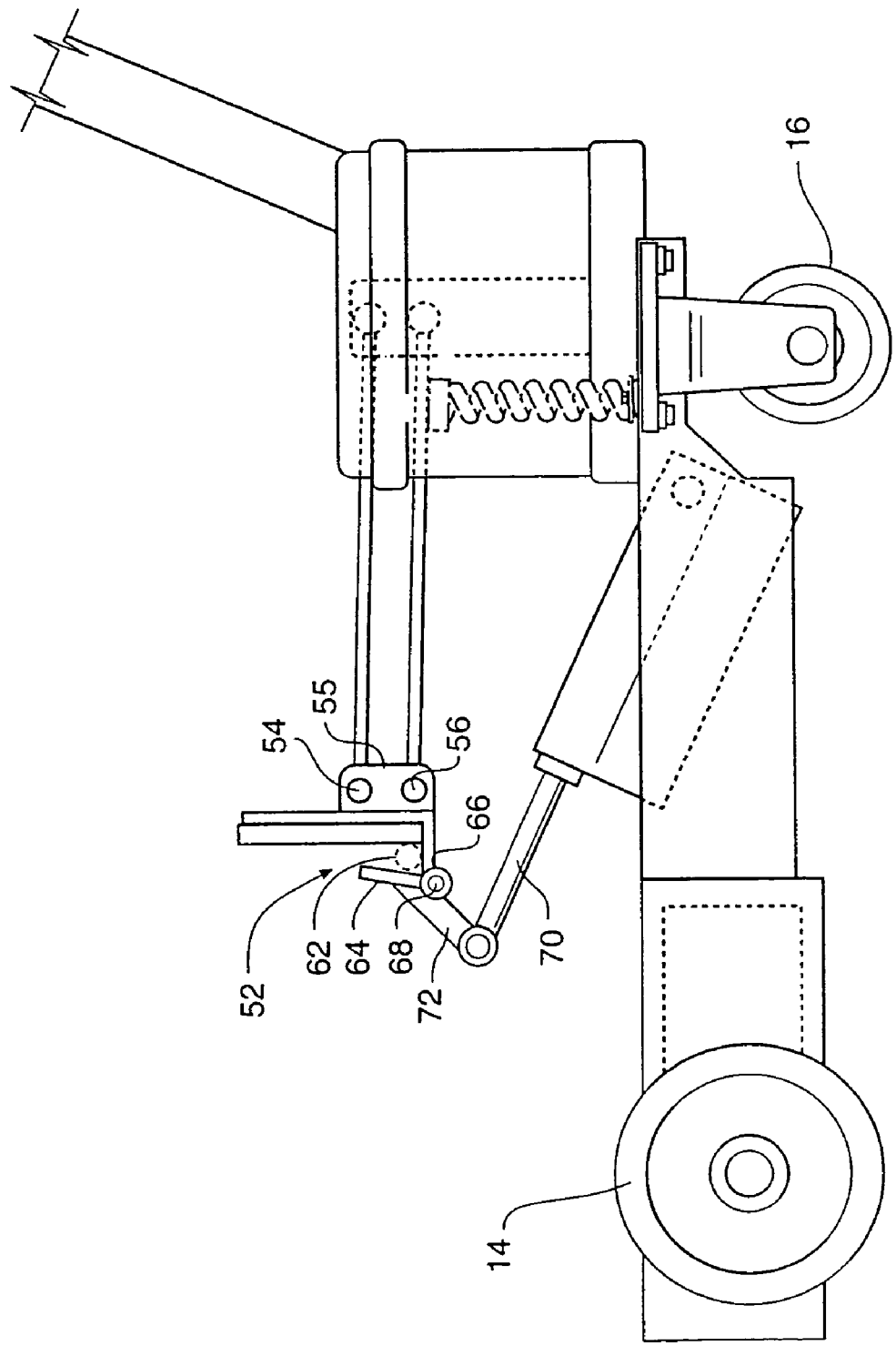
FIG. 5 shows a side view of the lifting device of FIG. 1 engaging a horizontal bar of a bed.

The bars 46, the portion of the brackets 42 between the uppermost and lowermost lifting points 48 and 50, and the lifting cradle 52 together form a pivoting parallelogram arrangement that may be moved around the connection points 48 and 50 from lowered positions as shown in FIG. 3 to a raised position as shown in FIGS. 4 and 5. Further, as previously noted the actuator 24 is a withdrawn condition rests in the intermediate section 20 of the frame 21. In addition, the rear of the housing 18 has angled and cut out portions that allow the lifting cradle 46 and forward potions of the lifting arm 44 to be lowered so that a lower limb of the cradle is generally level with an upper surface of the housing 18.

The lifting arm 44 is biased into a raised position by a spring 58. The spring 58 is secured at its base to the rearward portion of the platform 12 and is a snug fit in a collar 60 located on the underside of the lower bar 46 of the lifting arm 44.

The lifting cradle 48 attached to the forward ends of the lifting arm 44 consists of a right-angled bracket adapted to collect and receive a horizontal cross member of a 62 bed or other item to be lifted. The lifting cradle 52 is open to the rear of the device 10 to thus To assist in understanding the invention the cross member 62 is indicated generally in dotted lines without illustration of the remaining portions of the bed.

The lower horizontal limb of the lifting cradle 52 is formed in two parts a front section 64 and a rear section 66. A hinge 68 connects the two sections 64, 66 and thus the front section is able to pivot around the hinge 68 towards the rear section 64 as shown in FIG. 5.

Positioned below the lifting arm 44 and lifting cradle 52 is the actuator 24. As previously described the actuator 24 is secured in the frame 12 by means of rearward pins 26. It can also be seen from the drawings that at its forward end the piston 70 of the actuator 24 is connected through attachment plate 72 to the underside of the front section 64 of the lifting cradle 52.

At rest, the actuator 24 assumes a withdrawn position as shown in FIG. 3. In the position shown in FIG. 3 the actuator 24 is pulled into the intermediate frame section 20 of the frame 12. The lifting arm 44 is drawn downwardly against the action of the spring 58. As the actuator is operated the piston 70 emerges the spring 58 acts against the lifting arm 44 to thereby raise the level of the lifting arm 44 and lifting cradle 52 towards the horizontal cross member 62. The coil spring 58 serves to assist in collecting the cross member 62 in the lifting cradle. As the position of the lifting cradle is raised to the cross member 62 and bed end are thereby lifted off the ground and are supported for movement.

As has been noted, the downward pressure exerted by the spring 58 moderates the upward movement of the lifting arm 44. As the lifting arm 44 is raised it comes into contact with the cross member 62. The cross member 62 creates a resistance to the lifting action counterbalancing the biasing action of the spring 58. Thus, as the lifting arm 44 attains the position shown in FIG. 4, with the lifting cradle slightly elevated with respect to the rear part of the lifting arm 44 further travel by the piston 70 does now affect the lifting arm 44 but begins to act on the lower limb of the lifting cradle 52 and the piston 70 now acts through the front portion 64 of the lifting cradle 52. Because the position of the lifting arm 44 is fixed the front portion 64 of the lifting cradle is now rotated around the hinge 68 thus embracing the bed cross member 62.

It can therefore be seen that the influence of the spring 58 on the lifting mechanism is such that the lifting cradle 52 is maintained in the open position and only begins to rotate into the engaged position shown in FIG. 5 when an object resisting the spring action is encountered, that is by the exertion of downward pressure.

Operation of the device 10 is controlled through the control panel 36 on the handle 34. The operator thus drives the device 10 to a position where the front wheels 14 are positioned below a bed cross-member 62. The lifting device 10 is especially suitable for moving devices having castor wheels at the opposite end to the lifted end of the bed as is the case with most hospital beds. However, it is noted that the device 10 is also suitable for operation with object having fixed axle wheels at the lifted end.

The low level frame 12 is able to fit neatly below the cross member 62 and the actuator 24 activated. The lifting arm 44 rises under the combined influence of the spring 58 and actuator 24 as described and the lifting cradle 52 collects the bed cross member 62 therein. At the point where the lifting arm reaches the cross member 62 the piston action then continues and, as described rotates the front part 64 of the cradle 46 around the hinge 68 to engage the cross member. The lifting device 10 now supports the weight of the bed at one end and the bed can be moved by operation from the control unit 36. The front wheels 14 principally take the load of the bed. Thus, the rear castor wheels 16 are relatively free and can swivel allowing controlled movement of the bed even in confined spaces. The two powered driven wheels are independently powered to effect steering of the machine and bed combination. Castor wheels at the opposite end of the bed carry the remaining weight of the bed.

The invention has been described by way of example. The examples are not, however, to be taken as limiting the scope of the invention in any way. Modifications and variations of the invention such as would be apparent to a skilled addressee are deemed to be within the scope of the invention.

The invention claimed is:

1. A lifting device characterised by:
    a base frame, said base frame having associated drive means;
    a lifting arm connected at a first end thereof to a pair of upstanding brackets secured to the base frame, said lifting arm being pivotally movable with respect to the frame and being movable between a withdrawn condition and an extended lifting condition and a lifting cradle located at a free end of said lifting arm, said lifting cradle being movable between open and engaged positions;
    a single actuator connected to the lifting arm to effect a lifting movement of the lifting arm between the withdrawn and extended conditions, said single actuator being connected to a hinged section of a lowermost limb of said lifting cradle; and wherein movement of the lifting arm between the withdrawn condition and the extended lifting condition, and the movement of the lifting cradle between the open and engaged positions, occur sequentially;
    wherein the lifting arm moves in response to said single actuator only a predetermined distance and is stopped by vertical pressure from further movement such that action of the single actuator is then concentrated on the hinged section of said limb thereby causing hinged section of said limb to rotate about the hinge in response to movement of the single actuator to thereby move said cradle from the open to the engaged position.

2. A lifting device according to claim 1, characterised by when the lifting arm is in the withdrawn condition the arm is secured within the frame so that the device maintain a low profile as to be useable to move articles from a position close to a ground surface.

3. A lifting device according to claim 1, characterised by an electrically driven actuator used for effecting movement of the lifting arm between the withdrawn and extended conditions.

4. A lifting device according to claim 1, characterised in that the lifting arm takes the form of a pair of vertically spaced bars each pivotally attached at a first end to the pair of upstanding brackets upstanding from the frame and wherein the lifting arm extends forwardly over the frame and includes the lifting cradle carried on the end of the arm, the lifting cradle being pivotally attached to each of the vertically spaced bars, a pair of rear flanges on the lifting cradle serving as points of attachment for the bars through pivot connections.

5. A lifting device according to claim 4, characterised in that the bars, the portion of the brackets between the bars, the lifting cradle and the portion of the rear flanges between the bars together form a pivoting parallelogram arrangement that may be moved around the connection points from lowered to raised positions.

6. A lifting device according to claim 1, characterised in that the lifting arm is acted on by both an electric actuator and, in an opposing direction, by biasing means that serve to moderate the action of the actuator.

7. A lifting device according to claim 6, characterised in that the biasing means is a spring located between said frame and said lifting arm.

8. A lifting device according to claim 1 characterised in that, the frame includes both positioning wheels mounted thereon for positioning beneath an article to be lifted and drive wheels associated with said drive means.

9. A lifting device according to claim 1, characterised in that the drive means are operated by two electric motors coupled to reduction gear boxes.

10. A lifting device according to claim 1, characterised in that a handle is positioned at the rear of the frame, said handle being pivotally connected to the frame and, incorporating controls therein that operate the drive means and the lifting arm and lifting cradle.

11. A lifting device according to claim 10, characterised in that a control unit is located at the top of the handle, wherein said control unit is operatively connected to both the drive means and the lifting arm and lifting cradle, said control means allowing control of forwards and backwards movement, speed, lifting operations and further including a brake function controller.

* * * * *